(12) United States Patent  
Le Pabic

(10) Patent No.: US 7,972,202 B2
(45) Date of Patent: Jul. 5, 2011

(54) PORTIONING DEVICE INCLUDING CLAMPS AND A CUTTING BLADE

(75) Inventor: Fabrice Le Pabic, Camors (FR)

(73) Assignee: Stork Food Systems France, Baud (FR)

( * ) Notice: Subject to any disclaimer, the term of this patent is extended or adjusted under 35 U.S.C. 154(b) by 0 days.

(21) Appl. No.: 12/597,993

(22) PCT Filed: Apr. 25, 2008

(86) PCT No.: PCT/FR2008/050754
§ 371 (c)(1),
(2), (4) Date: Oct. 28, 2009

(87) PCT Pub. No.: WO2008/155491
PCT Pub. Date: Dec. 24, 2008

(65) Prior Publication Data
US 2010/0184364 A1    Jul. 22, 2010

(30) Foreign Application Priority Data

May 2, 2007 (FR) ...................................... 07 03162

(51) Int. Cl.
*A22C 11/00* (2006.01)
(52) U.S. Cl. ........................................................ 452/49
(58) Field of Classification Search .............. 452/46–49, 452/51
See application file for complete search history.

(56) References Cited

U.S. PATENT DOCUMENTS

| | | | | |
|---|---|---|---|---|
| 4,614,005 | A | * | 9/1986 | Townsend ........................ 452/47 |
| 5,145,450 | A | * | 9/1992 | Staudenrausch et al. ....... 452/47 |
| 5,709,600 | A | * | 1/1998 | Xie et al. ......................... 452/49 |
| 6,482,079 | B1 | * | 11/2002 | Nakamura et al. .............. 452/47 |
| 6,932,689 | B2 | * | 8/2005 | Stimpfl ............................ 452/49 |
| 7,381,123 | B2 | * | 6/2008 | Bachtle ........................... 452/46 |
| 7,479,058 | B2 | * | 1/2009 | Baechtle et al. ................ 452/51 |
| 7,625,266 | B2 | * | 12/2009 | Bontjer et al. .................. 452/49 |

FOREIGN PATENT DOCUMENTS

| | | |
|---|---|---|
| EP | 0239144 A | 9/1987 |
| EP | 0247545 A | 12/1987 |
| EP | 1042957 A | 10/2000 |
| EP | 1767096 A | 3/2007 |

* cited by examiner

*Primary Examiner* — Thomas Price

(57) ABSTRACT

The invention relates to a device for dividing a continuous sausage into portions, in particular sausage links. The invention includes at least one pair of opposing clamps which can be moved towards one another by actuation means in order to crush the sausage. Each clamp includes at least a first plate (141, 151) and a second plate (142, 152), each of said plates having front clamping edges (141a, 151a; 142a, 152a) and being arranged such that the front edge of the first and second plates form respectively first (181) and second (182) variable-cross-section passages. The invention also includes at least one blade associated with the pair of clamps, which can be moved transversely to the plates between the first passage and the second passage in order to cut the sausage.

12 Claims, 4 Drawing Sheets

PORTIONING DEVICE INCLUDING CLAMPS AND A CUTTING BLADE

BACKGROUND OF THE INVENTION

The present invention relates to a device for portioning a continuous strand in order to form individual portions, especially a device for portioning comprising at least one pair of pliers associated to a cutting blade, particularly for producing sausages from a continuous strand constituted of minced meat or fish and/or vegetables, covered by a skin or casing.

There has been known from patent document EP 1 434 490, portioning devices for producing sausage-type products, comprising a pair of opposite pliers able to be moved towards one another by actuation means from an open position to a closed position in order to pinch the strand, and cutting means comprising one blade associated to the pair of pliers able to be actuated by actuation means to cut the strand when the pliers are in a closed position. Each plier comprises one plate provided at the end with a front pinching edge, substantially V-shaped, with the two pliers being shifted in relation to one another in such a way that during their displacement towards the closed position, the plates overlap like shears, and form by their front edge a passage or diaphragm whose cross-section decreases progressively. The two pliers are arranged and moved in such a way that a passage remains in the closed position. The blade may be mounted on one of the two pliers and be actuated by a jack to cut the strand just upstream or downstream from the plates.

This plier system ensures a progressive pinching around the strand, limiting risks of casing tearing. Meanwhile, in the event of producing sausages from a strand obtained by coextrusion of the casing and a food product, the shearing efforts applied by the pliers on the casing that has just been formed, for example by gelling, may be too important, and lead to a breaking of the casing. Furthermore, the cutting being realized just upstream or downstream from the pliers, the food product tends to come out of the casing by the end of the sausage formed on the side of the blade.

SUMMARY OF THE INVENTION

The present invention is aimed to provide a portioning device that overcomes the aforementioned drawbacks and that makes it possible to obtain a clear and precise cutting of portions, particularly in the case of sausages having a coextruded casing.

With this regard, the object of the present invention is a device for portioning a continuous strand for producing portions, especially sausages, comprising pinching means comprising at least one pair of opposite pliers able to be moved towards one another by first actuation means from an open position to a closed position to pinch the strand, with each plier of the pair comprising at least one plate provided at the end with a front pinching edge, for example substantially V-shaped, with the two pliers being shifted in relation to one another in such a way that during their displacement towards the closed position, the plates overlap such as shears and form by their front edge a passage or diaphragm whose cross-section decreases progressively, said passage having a non null minimal section in the closed position of the pliers, and cutting means comprising at least one blade associated to the pair of pliers, mounted for example on one of said pliers, able to be actuated by second actuation means to cut the strand when the pliers are close to their closed position or in their closed position, characterized in that each pliers of said pair comprises at least one first plate and a second plate arranged such that, during the displacement of the pliers towards their closed position, the first plates and second plates respectively form via their front edge a first passage and a second passage with a variable cross-section, said blade associated to said pair of pliers being able to be moved transversally to the plates between the first passage and second passage to cut the strand.

According to the invention, in the event of producing sausages from a strand formed from a food product wrapped in a casing, the dual-plate plier system makes it possible to progressively pinch the continuous strand and to progressively drive out the food product from the casing between the first passage and the second passage, also called first and second diaphragms, to form between them a squashed flattened portion, of restricted cross-section, possibly substantially without food product, the cutting being then carried out at this flattened portion.

According to a feature, said pliers are arranged in such a way that their plates are positioned in alternation in the closed position of the pliers, two adjacent plates not belonging to the same pliers.

According to an embodiment, said first actuation means are able to bring pliers closer together and to bring pliers further apart according to a back-and-forth movement in the orthogonal direction as well as in the direction parallel to the transport direction of the strand, the displacement speed of the pliers being substantially equal to the transport speed of the strand when the pliers are in contact with the strand for pinching and cutting operations, and variable outside pinching and cutting operations to carry out a portioning of variable length.

Advantageously, the pliers of each pair are mounted in rotation on two rotatable discs, preferably around axes substantially parallel to the axes of rotation of the rotatable discs, and perpendicular to the transport direction of the strand, the discs being driven in rotation by at least one variable speed motor. Advantageously, the rotation of each rotatable disc leads via a gear system, to the rotation in the opposite direction of the plier(s) mounted thereon.

According to another embodiment, the pliers are mounted pivoting in relation to each other around an axis, the pliers being able to be maneuvered by cams between their closed position and their open position.

According to a feature, the blade is mounted pivoting between the two plates of a first plier, said second actuation means being able to make the blade pivot between a retracted position and an active cutting position.

According to another feature, the blade is solicited by elastic return means towards its retracted position, the second actuating means for actuating the blade being mounted on the second plier of the pair. Said second actuation means advantageously comprising a finger mounted on the upper portion of the second plier and able to come in abutment with a pivoting arm whereon the blade is mounted to handle the blade towards its active position against the elastic return means.

In the event of pivotally mounted pliers, the blade is advantageously mounted on a pivoting arm able to cooperate with a cam to handle the blade between its two positions.

The invention will be better understood, and other objects, details, characteristics and advantages will become more apparent in the following detailed explanatory description of two currently-preferred embodiments of the invention with reference to the accompanying schematic drawings in which:

DETAILED DESCRIPTION OF THE PREFERRED EMBODIMENTS

FIGS. 1 to 10 show a first embodiment of a device for producing sausages from a continuous strand formed from a food product covered by a casing. The device is advantageously used for portioning a strand obtained by coextrusion of a food product coated by a starting base, comprising for example one or several hydrocolloids, which base is intended to form the skin by gelling in a bath downstream from the coextrusion device.

Figure 1:
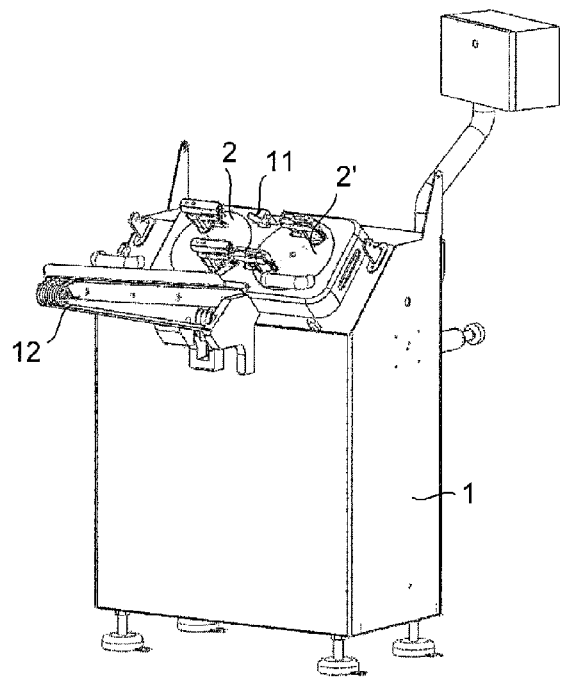
FIG. 1 is a perspective schematic view of a device for portioning according to a first embodiment.
Figure 2:
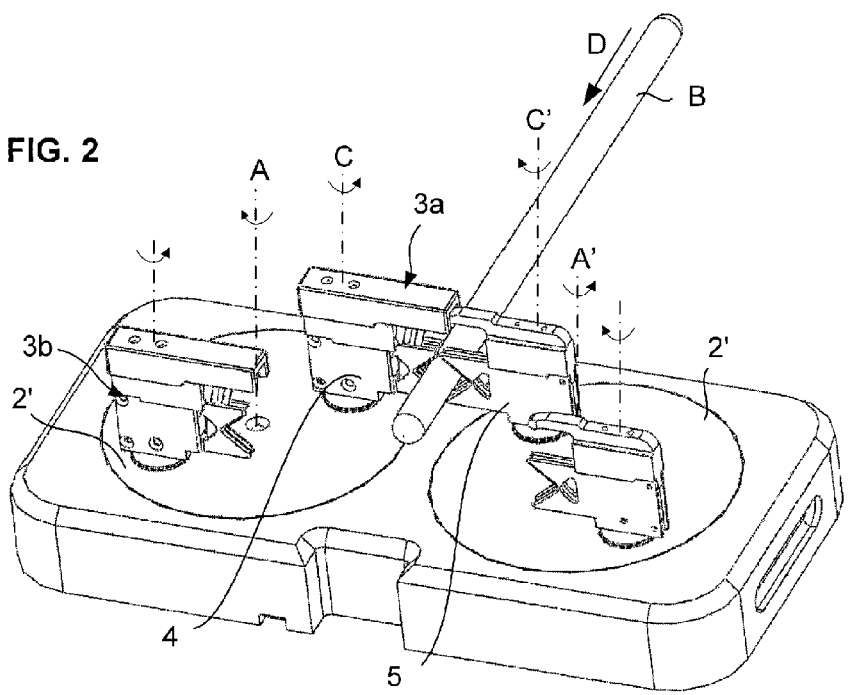
FIG. 2 is an enlarged perspective schematic view of two pairs of pliers on the rotatable discs of FIG. 1, the pliers of a first pair arriving in contact with the continuous strand.
Figure 3:
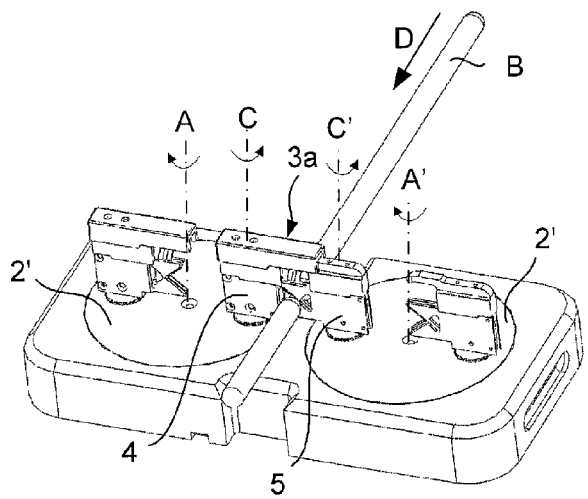
FIGS. 3 and 4 are similar views to FIG. 4, on a small scale showing the pliers of the first pair in various angular positions, respectively just before the alignment of the axes of rotation of the pliers with the axes of rotation of the disks, then during the spacing of the pliers from each other.
Figure 4:
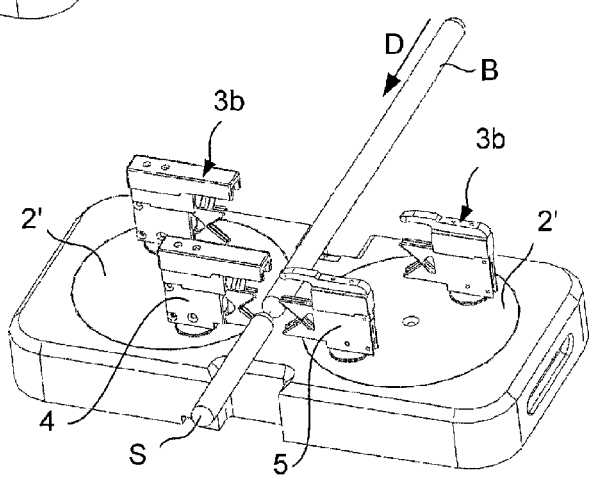
Figure 5:
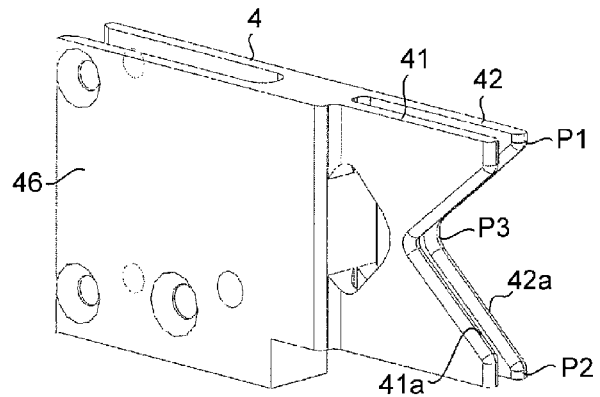
FIG. 5 is a perspective schematic view of pliers.

In this first embodiment, the pliers of each pair are mounted in rotation on rotatable discs to be moved according to a back-and-forth movement by circular translation. With reference especially to FIGS. 1 and 2, the device comprising a support chassis 1 on the upper part from which are mounted a first rotatable disc 2, of axis of rotation A, and a second rotatable disc 2' of axis of rotation A', both axes of rotation being arranged parallely to each other and substantially perpendicularly to the direction of advancement D of the strand to be portioned. A first pair 3a of pliers comprises a first plier 4 mounted pivoting on the first rotatable disc 2 around an axis of rotation C arranged parallel to axis of rotation A of the disc and at a distance from it, and a second plier 5 mounted in a similar manner on the second disc 2' around an axis of rotation C' parallel to the axis A'.

Figure 6:
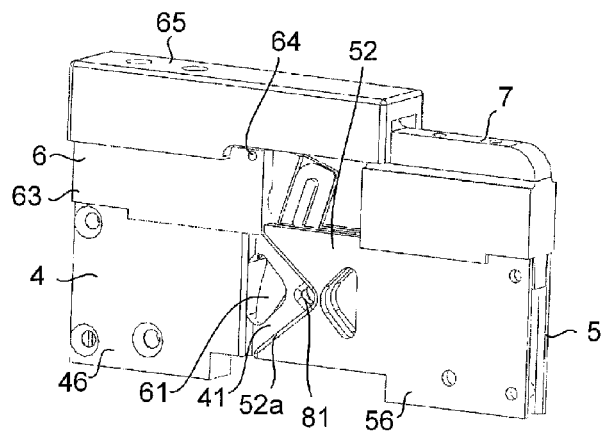
FIG. 6 is an enlarged perspective schematic view of the first pair of pliers on FIG. 3.
Figure 7:
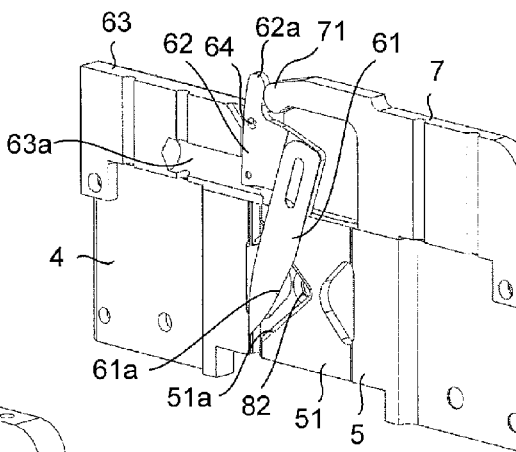
FIG. 7 is a perspective and cross-sectional longitudinal view of the pair of pliers in FIG. 6, showing the pivoting mounting of the blade on the first plier.
Figure 8:
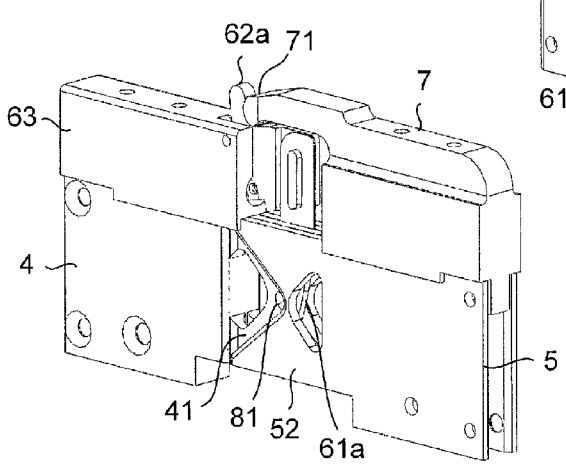
FIG. 8 is a perspective view of the first pair of pliers when the axes of rotation of the pliers and the axes of rotation of the discs are aligned, that is to say when the passages have reached their minimal cross-section, the blade in active position.

With reference to FIG. 6, the first plier 4 comprises a first plate 41 and a second plate 42 parallel to each other, and spaced apart from each other. Each plate exhibits at its front end a notch defining a front pinching edge 41a, 42a in a general V-shape, with two external points P1 and P2 on either side of a retracted internal point P3. The two pinching edges 41a, 42a exhibit substantially similar profiles. Alternatively, these profiles may be slightly different. Both plates are secured to a mounting part 46 whereby the pliers are mounted pivoting on the first disc, its plates being arranged parallel to the axis of rotation C. The plates and the mounting part are for example formed from a sole single piece. The second plier of the first pair are formed from a piece that is similar to that of the first piece. With reference to FIGS. 6 and 7, it comprises two plates 51 and 52 with pinching edges 51a and 52a, and a mounting part 56.

Such as shown on FIG. 2, the discs are driven in rotation around their axis A and A' of opposite directions, such that the pliers move in the transport direction D of the strand when they are in contact with the latter, and at the same speed as that of the strand, and the pliers are driven in rotation on the discs around their axis C and C' such as to remain constantly arranged perpendicularly to the transport direction D of the strand, and parallely to each other, with their front edge facing.

With reference to FIGS. 6 and 7, the first plier 4 are equipped with the cutting system 6. The cutting system comprising a flat blade 61 moveably mounted on an arm 62, said arm being mounted pivoting on a support 63 around an axis of rotation 64 perpendicular to the plates. The support is assembled on the top of the mounting part of the first plier, the blade being arranged between the two plates in parallel to them with its cutting edge 62a oriented towards the outside. The blade is closer to the first plate and may be placed against it. The blade is elastically solicited in a retracted position by a traction spring (not shown), housed in a housing 63a and connected by its ends to the arm 62 and at the bottom of the housing. In this retracted position shown in FIGS. 6 and 7, the blade is arranged between the two plates, set back with respect to their pinching edge 41a, 42a. On the side of its axis of rotation 64 opposite from the fixing point of the spring, the arm extends outside its support 63, by a pin 62a able to cooperate with the free end 71 of an actuation finger 7 mounted on the second plier 5 to make the blade pivot counter to the spring towards an active position shown in FIG. 8. In this active position, the cutting edge 61a of the blade is arranged beyond the inner points P3 of the front pinching edges of the plates 41, 42, 51, 52. The actuation finger is mounted on the upper part of the second plier 5 and extends above the two plates 51, 52 with its free end 71 arranged at a distance and substantially in the perpendicularity of the external points P1, P2 of the pinching edges 51a and 52a. The first plier are equipped with a guiding piece 65, formed by a rail 65 of inverted U-shaped transversal cross-section mounted on the support 63, that extends above the plates 41, 42 to receive and guide the finger during the nearing of the two pliers to pinch and cut the strand.

FIG. 2 shows the angular position of the discs wherein the two pliers of the first pair come in contact with strand B to be portioned. Such as shown in FIG. 1, the device advantageously comprises in the inlet a guiding system, formed for example of two rollers arranged in a V-shape, to guide between the two discs the strand coming from the coextrusion device. From this angular position of the discs, the first plate 51 of the second plier comes to interpose between the two plates 41, 42 of the first plier, and the second plate 52 of the second plier comes to position itself in front of the first plate 41 of the first plier. The front edge 41a of the first plate of the first plier and the front edge 52a of the second plate of the second plier form a first passage or diaphragm 81 (FIG. 8) whose section gradually diminishes, and the front edge 42a of the second plate of the first plier and the front edge 51a of the first plate of the second plier form a second diaphragm 82 (FIG. 7), whose section gradually diminishes. The strand is thus progressively squashed between the two diaphragms 81 and 82. In the shown position in FIG. 3, the actuation finger 7 abuts against the pin. From this position of FIG. 3 to that of FIG. 8, wherein axes C and C' of the pliers are aligned with axes A and A' of the discs, the finger abutting against the pin progressively moves the blade between the second plates 42 and 52 of the pliers, from its retracted position towards its active position, its cutting edge 61a moving between the diaphragms, beyond the internal points P3 of the plates 51 and 52 of the second plier to cut the squashed part of the strand. From this position shown in FIG. 8, the pliers are then spaced apart from each other, the blade returning to its retracted position under the effect of the elastic return of the spring. The sausages S that have just been cut are then recovered on the upper strand of an endless belt conveyor 12, driven by a motor 121, via a pulley, a belt and a gear system 122 such as shown schematically on FIG. 9.

As shown in figs, the rotatable discs may comprise a second pair 3b of pliers. On each disc, the pliers are arranged symmetrically on either side of the axis of rotation of the disc.

Figure 11:
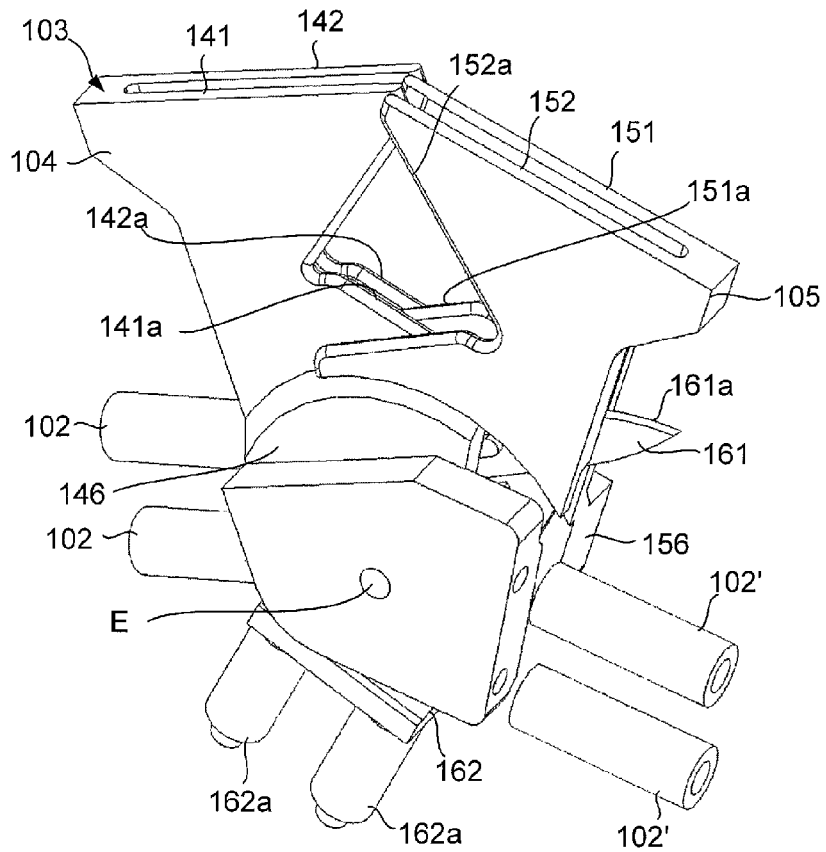
FIG. 11 is a perspective schematic view of a pair of pliers of a device according to a second embodiment; and, FIG. 12 shows a partial cross-sectional schematic view of the pliers according to FIG. 11 in closed position with the blade in retracted position.

As previously stated, the discs 2 and 2' are driven in rotation such that the pliers move at the same speed as the transport speed of the strand when the pliers are in contact with the strand. Outside this angular section whereon the pliers are in contact with the pliers, the rotational speed of the discs may be increased or reduced depending on the desired length of the sausages. The driving system of the discs and pliers is shown on FIGS. 10 and 11. The second disc 2' is driven in rotation by a motor 21 around its axis of rotation A'. The motor is for example a motor typically called brushless motor, controlled by a variator programmed to make the rotational speed of the disc vary depending on the desired length of the sausage. The peripheral edge of the second disc is provided with teeth that enmesh with those of the first disc to drive it into rotation in the opposite direction, around its axis A'. Each plier are mounted on an axis that crosses the disc throughout, and which fixedly holds in its inner portion a pinion 22. This pinion enmeshes with an intermediary pinion 23 rotatably mounted on the lower side of the disc. This intermediary pinion enmeshes with an axial pinion 24 that is fixedly mounted on the chassis and which surrounds the axis of rotation of the disc. Thus, the rotation of the second disc 2' in one direction by the motor 21 drives the rotation of the first disc 2 in the opposite direction, as well as the rotation of each plier in the opposite direction of the rotation direction of the disc whereon it is mounted.

Figure 9:
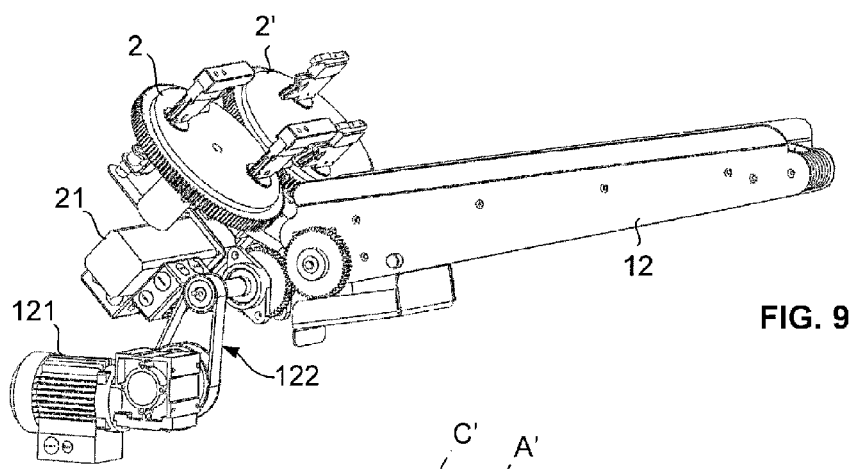
FIG. 9 is perspective schematic view of constitutive elements of the device in FIG. 1, among which the rotatable discs equipped with the pairs of pliers and the recovering conveyor of sausages with their respective driving system.
Figure 10:
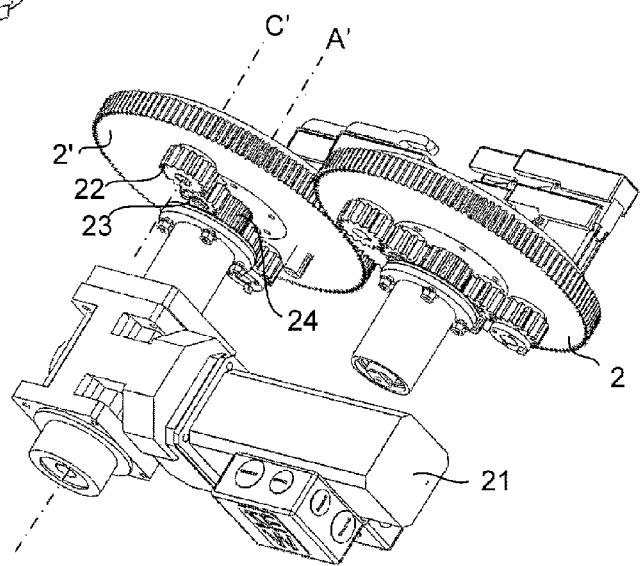
FIG. 10 is a perspective view of the two rotatable discs illustrating the driving system in rotation of the two rotatable discs and the pliers.

FIG. 9 shows a pair 103 of pliers according to a second embodiment, wherein the pliers 104, 105 each comprise as previously two plates 141, 142 and 151, 152 provided with an essentially V-shaped pinching edge 141a, 142a and 151a, 152a, the two pliers being this time assembled to each other by their mounting part 146, 156 in a pivoting manner around an axis E perpendicular to the plates.

Several pairs of pliers are for example mounted in an endless belt arrangement parallel to the transport direction of the strand B. The pairs of pliers advance substantially at the same speed as the transport speed of the strand, the spacing between two successive pairs of pliers corresponding to the desired length of the sausage.

Figure 12:
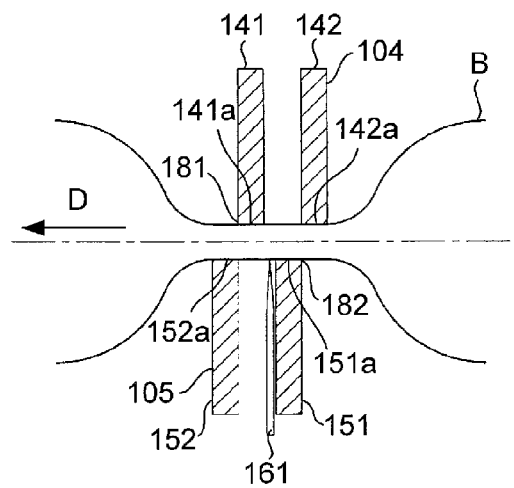

The mounting part of each pliers is equipped with two rollers 102, 102' mounted idle, the rollers being able to cooperate with cams (not shown), for example in the form of a guiding rail passing between the two rollers, to handle the pliers between their open position and their closed position shown in FIG. 12. The cutting blade 161 is assembled to an arm 162 mounted pivoting around axis E, and equipped at its end with two rollers 162a, said rollers cooperating with mechanical cams to move the blade between its active cutting position and its retracted position shown in FIG. 11, wherein the blade is between the plates of the second plier 105, its cutting edge 161a set back from the front edges 151a, 152a.

As previously, the strand is gradually squashed between the two diaphragms 181 and 182, formed respectively by the front edge 141a of the first plate of the first plier and the front edge 152a of the second plate of the second plier, and the front edge 142a of the second plate of the first plier and the front edge 151a of the first plate of the second plier, the cutting being achieved between the first plates 141 and 151.

Although the invention has been described in connection to two particular embodiments, it is to be understood that it is in no way limited thereto and that it includes all the technical equivalents of the means described as well as their combinations should these fall within the scope of the invention.

What is claimed is:

1. Device for portioning a continuous strand in order to form portions, especially sausages, comprising pinching means comprising at least one pair of opposite pliers able to be moved toward one another by a first actuation means from an open position to a closed position in order to pinch the strand, with each plier of the pair comprising at least one plate provided at the end with a front pinching edge, with the two pliers being shifted in relation to one another in such a way that, during their displacement towards the closed position, the plates form via their front edge a passage or diaphragm whose cross-section decreases progressively, and cutting means comprising at least one blade associated to the pair of pliers able to be actuated by a second actuation means in order to cut the strand, the displacement speed of the pliers being substantially equal to the transport speed of the strand when the pliers are in contact with the strand for the pinching and cutting operations, characterised in that each plier (4, 5; 104, 105) of said pair (3a, 3b) comprises at least a first plate (41, 51; 141, 151) and a second plate (42, 52; 142, 152) arranged in such a way that, during the displacement of the pliers towards their closed position, the first plates and the second plates form respectively via their front edge (41a, 51a; 141a, 151a; 42a, 52a; 142a, 152a) a first passage (81, 181) and a second passage (82, 182) with a variable cross-section, said blade (61, 161) associated to said pair of pliers being able to be moved between the first passage and the second passage in order to cut the strand.

2. Device for portioning according to claim 1, characterised in that said pliers (4, 5; 104, 105) are arranged in such a way that the plates thereof (41, 42, 51, 52; 141, 151, 142, 152) are positioned in alternation in the closed position of the pliers.

3. Device according to claim 1, characterised in that said first actuation means (2, 2') are able to bring pliers (4, 5) closer together and further apart according to a back-and-forth movement, in the orthogonal direction as well as in the direction parallel to the transport direction (D) of the strand (B), the displacement speed of the pliers being substantially equal to the transport speed of the strand when the pliers are in contact with the strand for the pinching and cutting operations, and variable outside of the pinching and cutting operations.

4. Device according to claim 3, characterised in that the pliers (4, 5) of each pair are mounted in rotation on two rotatable discs (2, 2') around axis (C, C') substantially parallel to the axes of rotation (A, A') of the rotatable discs, and perpendicular to the transport direction (D) of the strand, with the discs being driven in rotation by at least one variable speed motor (21).

5. Device according to claim 4, characterised in that the rotation of each rotatable disc (2, 2') drives, via a gear system (22, 23, 24), the rotation in the opposite direction of the plier(s) mounted thereon.

6. Device according to claim 1, characterised in that the pliers (104, 105) are mounted pivoting in relation to each other around an axis (E), the pliers being able to be manoeuvred by cams between their closed position and their open position.

7. Device according to claim 6, characterised in that the blade (161) is mounted on a pivoting arm (162) able to cooperate with a cam in order to maneuver the blade between its two positions.

8. Device according to claim 1, characterised in that the blade (61, 161) is mounted pivoting between the two plates of a first plier, said second actuation means being able to pivot said blade between a retracted position and an active cutting position.

9. Device according to claim 8, characterised in that the blade (61) is solicited by elastic return means towards its retracted position, with the second actuation means (7) for actuating the blade being mounted on the second plier of the pair.

10. Device according to claim 9, characterised in that said second actuation means include a finger (7) mounted on the upper portion of the second plier and which is capable of abutting against a pivoting arm (62) whereon the blade (61) is mounted in order to manoeuvre the blade towards its active position against the elastic return means.

11. Device according to claim 1, characterized in that at least one blade is actuated by the second actuation means in order to cut the strand when the pliers are close to their closed position.

12. Device according to claim 1, characterized in that at least one blade is actuated by the second actuation means in order to cut the strand when the pliers are in their closed position.

* * * * *